(12) United States Patent
Jendrian

(10) Patent No.: US 7,104,389 B2
(45) Date of Patent: Sep. 12, 2006

(54) CONVEYING DRUM WITH CLAMPING DEVICE

(75) Inventor: Torsten Jendrian, Hamburg (DE)

(73) Assignee: Hauni Maschinenbau AG, Hamburg (DE)

( * ) Notice: Subject to any disclaimer, the term of this patent is extended or adjusted under 35 U.S.C. 154(b) by 0 days.

(21) Appl. No.: 10/937,288

(22) Filed: Sep. 10, 2004

(65) Prior Publication Data

US 2005/0062223 A1    Mar. 24, 2005

(30) Foreign Application Priority Data

Sep. 23, 2003  (DE) .............................. 103 44 381

(51) Int. Cl.
*B65G 17/46* (2006.01)

(52) U.S. Cl. .............................. 198/471.1; 198/474.1; 198/476.1

(58) Field of Classification Search ............. 198/471.1, 198/474.1, 476.1, 478.1, 780, 781.02, 377.04, 198/492, 789, 951, 781.01
See application file for complete search history.

(56) References Cited

U.S. PATENT DOCUMENTS

| | | | |
|---|---|---|---|
| 1,611,912 A | 12/1926 | Hleb | |
| 3,455,586 A | 7/1969 | Kurtzmann | |
| 3,498,653 A * | 3/1970 | McCreery | 403/322.2 |
| 4,438,774 A | 3/1984 | Dyett et al. | |
| 4,721,190 A * | 1/1988 | Schmidt et al. | 188/71.9 |
| 4,746,006 A * | 5/1988 | Nixon et al. | 198/458 |
| 6,064,032 A * | 5/2000 | Voss et al. | 219/121.67 |
| 6,513,781 B1 * | 2/2003 | Meyer et al. | 248/544 |

FOREIGN PATENT DOCUMENTS

| | | |
|---|---|---|
| AT | 45030 | 7/1909 |
| DE | 137262 C | 12/1902 |
| DE | 236134 C | 7/1911 |
| DE | 1 865 748 U | 1/1963 |
| DE | 28 23 609 A1 | 12/1978 |
| DE | 197 22 799 A1 | 12/1998 |
| DE | 101 16 684 A1 | 10/2002 |
| EP | 0 577 061 A1 | 1/1994 |
| EP | 0 674 853 A2 | 10/1995 |
| GB | 1109412 | 9/1966 |
| GB | 1184405 | 9/1968 |
| GB | 2 188 125 A | 9/1987 |

* cited by examiner

*Primary Examiner*—Gene O. Crawford
*Assistant Examiner*—Rashmi Sharma
(74) *Attorney, Agent, or Firm*—Venable LLP; Robert Kinberg; Catherine M. Voorhees

(57) ABSTRACT

An apparatus for transporting articles of the tobacco-processing industry including a rotationally driven conveying element, a support and, a clamping device. The clamping device has at least one drive element and at least two holding elements. The rotationally driven conveying element is detachably connected by the clamping device to the support so that a movement of the at least one drive element of the clamping device causes the at least two holding elements to change their position relative to each other, in a direction crosswise to the direction of movement the drive element. Depending on the direction of movement of the at least one drive element, the movement causes the at least two holding elements to either hold or release the rotationally driven conveying element and the support.

26 Claims, 2 Drawing Sheets

CONVEYING DRUM WITH CLAMPING DEVICE

CROSS-REFERENCE TO RELATED APPLICATION

This application claims the priority of German Patent Application No. 103 44 381.9, filed on Sep. 23, 2003, the subject matter of which is incorporated herein by reference.

BACKGROUND OF THE INVENTION

The invention relates to an apparatus for transporting articles of the tobacco-processing industry, in particular cigarettes; the apparatus comprises a rotationally driven conveying element, preferably a drum, as well as a support, wherein the conveying element is detachably connected to the support by means of a clamping device. In addition, the invention relates to the use of a clamping device with an apparatus of this type, as well as a machine of the tobacco-processing industry, in particular a filter-tipping machine.

Conveying drums are used, for example, in a filter-tipping machine for transporting rod-shaped smoking articles, such as filters, filter rods, tobacco rods and/or cigarettes or filter cigarettes. These conveying drums comprise a locally fixed control member on which a drum body is arranged that is rotationally driven by a drive shaft. During a format change at the filter-tipping machine, operating personnel will pull the drum bodies off the control members by loosening several screws to lift off the drum body and replace it with a new drum body, e.g. for cigarettes with a different diameter or a different length.

U.S. Pat. No. 4,438,774 discloses a conveying drum for cigarettes where the drum body is secured to the rotating shaft by means of a holding screw. To replace the drum body, the holding screw is manually unscrewed, so that the drum body can be removed from the control member.

DE-A-101 16 684 discloses an apparatus with a rotationally driven unit, in particular a drum, for which rotating clamping rings connect an internal hub and an external hub. A pressure exerted in an axial direction deforms the clamping rings to a clamping position, so that a connection between internal hub and external hub is created. On the whole, this mechanical clamping element has a very involved design.

In view of the art, it is therefore an object of the present invention to provide a drum for which the drum body can be replaced quickly while keeping the costs associated with manufacturing and/or maintaining the same low.

SUMMARY OF THE INVENTION

The above and other objects are achieved by an apparatus for transporting articles of the tobacco-processing industry including a rotationally driven conveying element, a support and, a clamping device. The clamping device has at least one drive element and at least two holding elements. The rotationally driven conveying element is detachably connected by the clamping device to the support so that a movement of the at least one drive element of the clamping device causes the at least two holding elements to change their position relative to each other, in a direction crosswise to the direction of movement the drive element. Depending on the direction of movement of the at least one drive element, the movement causes the at least two holding elements to either hold or release the rotationally driven conveying element and the support.

This object is solved with an apparatus for transporting articles of the tobacco-processing industry, in particular cigarettes; the apparatus comprises a rotationally driven conveying element, preferably a drum, and a support, wherein the conveying element is connected detachably to the support by means of a clamping device. The aforementioned apparatus is further modified in that the clamping device is provided with at least one drive element. Thus, a movement of the drive element will cause at least two, preferably three, holding elements to change their relative positions, crosswise to the movement direction of the drive element. The mechanical clamping device according to the invention is a clamping device for which the conveying element; and the support can be easily and securely connected to each other with only a few manual operations. As a result of a drive element movement, the holding elements in the form of interlocking means are moved crosswise to the movement direction of the holding element, so that the conveying element and the support are clamped together. This results in a very efficiently operating clamping device. In addition, this clamping device ensures that extremely high forces are generated for the clamping operation.

The holding elements can be inserted into a bushing or a recess in the support and/or the conveying element to clamp together the components.

The at least one drive element and the at least two holding elements are preferably arranged inside a housing, thus permitting an easy handling of the clamping device.

In addition, it is advantageous if the housing design takes the shape of a cylinder, in particular a clamping cylinder.

A bolt, in particular a screw bolt, and/or a ball can be used for the individual drive elements.

According to one preferred modification, the holding elements are balls.

The handling is simplified if the clamping device has a rotation-symmetrical design.

The mechanical stresses are reduced if the clamping device is arranged concentric to the axis of rotation for the conveying element.

The clamping device is provided with a gripping means (a gripping knob) for the manual operation.

In addition, it is advantageous if at least one drive element or the gripping knob is provided with a recess for accommodating a turning tool, in particular a hexagonal spanner. As a result, it is possible to generate a higher clamping force in the clamping device.

To retrofit an existing apparatus and/or conveying drums with the clamping device, it is advantageous if the clamping device is designed as adapter and is connected to a drum body.

The object is furthermore solved with a machine of the tobacco-processing industry, in particular a filter-tipping machine, which is provided with a device according to the invention.

In addition, the object is solved by the use of a clamping device in an apparatus as described in the above for transporting articles of the tobacco-processing industry, in particular cigarettes. To avoid repetitions, we explicitly point to the above-described clamping device according to the invention.

BRIEF DESCRIPTION OF THE DRAWINGS

The invention is explained in the following discussion of specific embodiments and the drawings without a view to restricting the general inventive idea. The enclosed schematic drawings illustrate the invention as follows.

DETAILED DESCRIPTION OF AN EMBODIMENT OF THE INVENTION

In the following Figures, respectively the same or the same type of elements and/or corresponding parts are provided with the same reference numbers and will thus not be introduced again. Instead, the differences in the embodiments shown in the Figures, as compared to the first embodiment, are explained.

Figure 1:
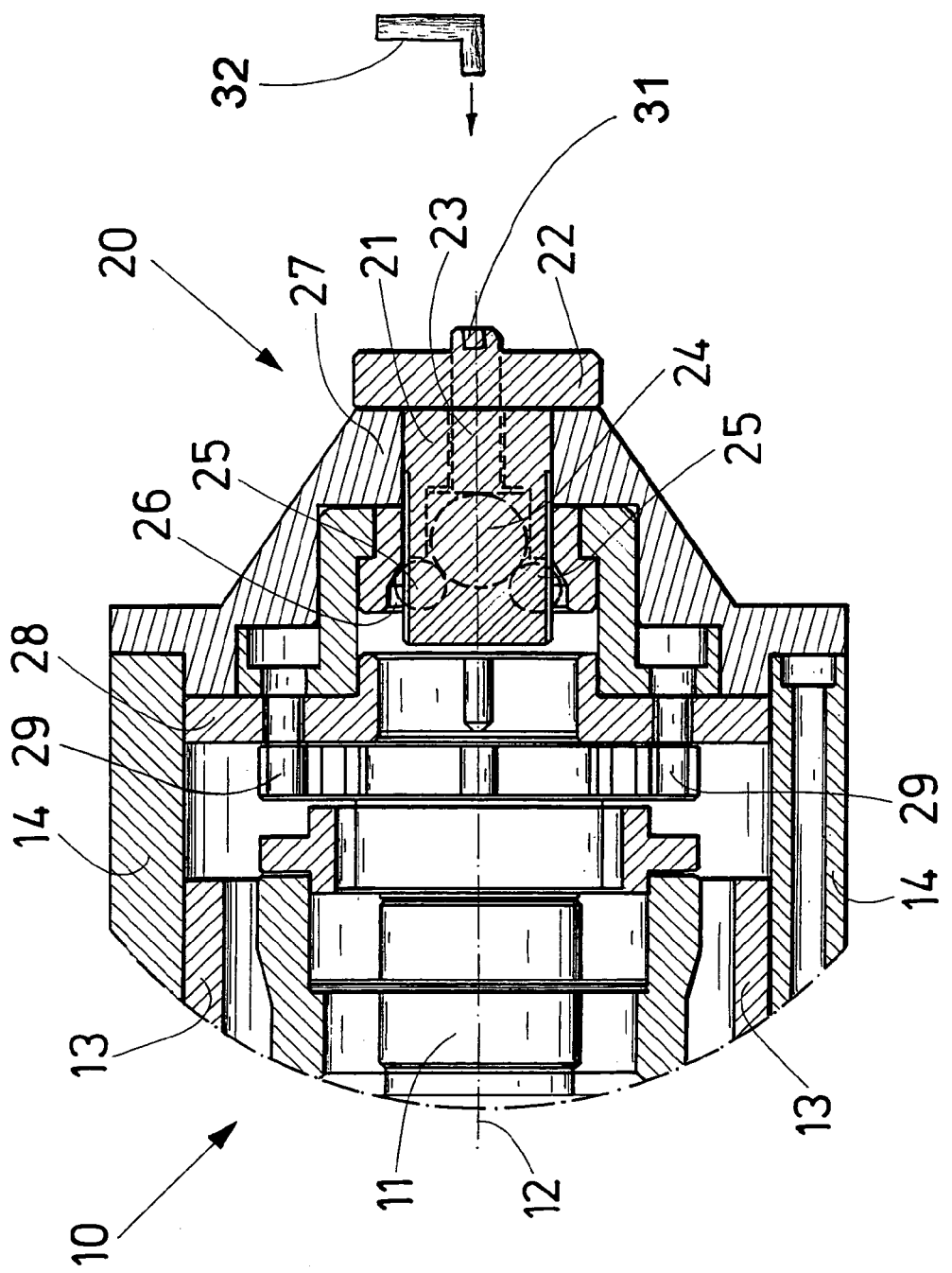
FIG. 1 illustrates details of a cross section through a conveying drum provided with a clamping device, wherein the clamping device is designed as an adapter according to one embodiment of the invention.

FIG. 1 shows a detailed cross-sectional view of a conveying drum for a machine in the tobacco-processing industry, in particular a filter-tipping machine, e.g. as shown in FIG. 1 of U.S. Pat. No. 6,064,032 (corresponding to DE-A-197 22 799). The subject matter of U.S. Pat. No. 6,064,032 is hereby recorded by reference thereto.

Figure 3:
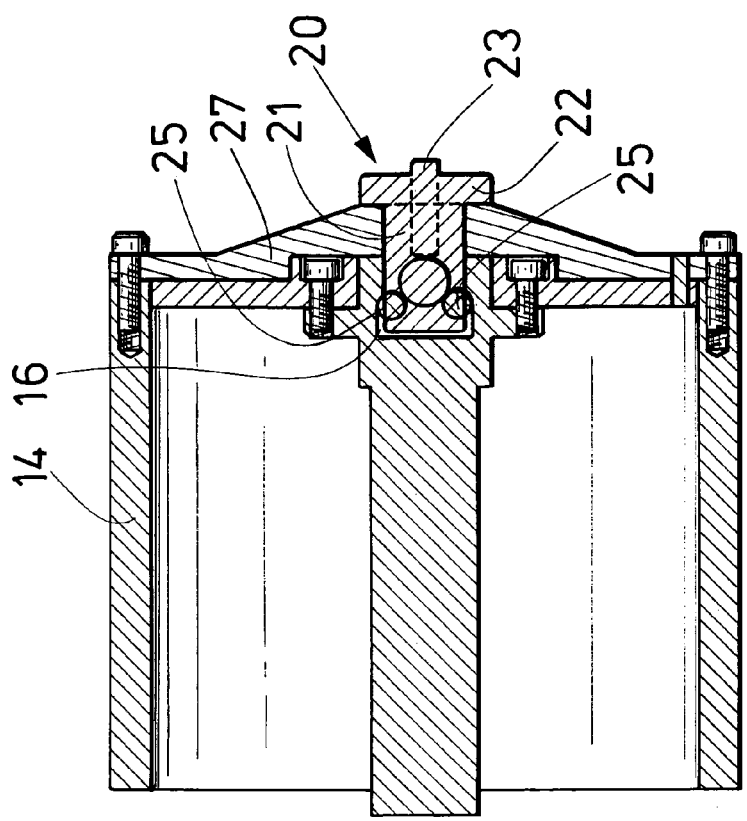
FIG. 3 is a cross section of a conveying drum with a different clamping device according to the invention.
Figure 2:
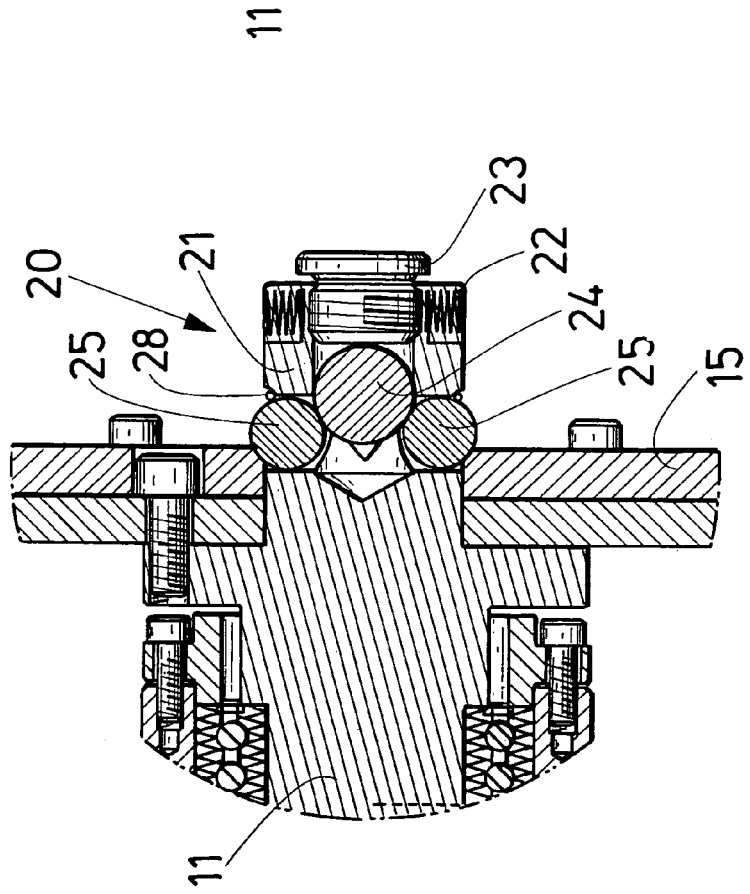
FIG. 2 is a partial, sectional view of a clamping device according to another embodiment of the invention showing details of a clamping device on a conveying drum.

FIG. 1 shows the end of a conveying drum 10 that faces away from the machine side. The conveying drum 10 comprises a support or drive shaft 11 with a rotational axis 12. The conveying drum 10 furthermore comprises a control member 13 which is rigidly connected to the machine side of the filter-tipping machine. The control member 13 is surrounded by a drum body 14, which is connected by means of a clamping device 20 to the drive shaft 11. The clamping device 20 may have a rotation-symmetrical structure, as shown in FIGS. 1–3.

The clamping device 20 of the embodiment shown in FIG. 1 is designed as an adapter, thus making it possible to retrofit present drum bodies with a clamping device 20 according to the invention.

The clamping device 20 forms a cover which is securely connected to the drum body 14 with a screw connection, for example. In addition, the clamping device 20 is provided with a housing 21, which may be a clamping cylinder 21, and is provided with a gripping knob 22 on the side of the housing 21 facing toward the outside of the clamping device 20. A pivot bolt 23 is arranged on the gripping knob 22, such that it can turn inside a cylindrical throughbore of clamping cylinder 21. The clamping cylinder 21 furthermore is provided on the inside with a ball 24 which is displaced with the aid of the pivot bolt 23. Distributed along the circumference of the central ball 24 are smaller balls 25 that are pushed toward the outside with the aid of a linear movement of the central ball 24, meaning they are moved and/or pushed crosswise to the movement direction of the ball 24. As a result, the outer balls 25 push against a cone of a bushing 26 and clamp on the external cover 27 of the clamping device 20 with the aid of an adapter ring 18. This adapter ring is screwed on the inside of drum 10 with screws 29 to the drive shaft 11.

Practical operations have shown that for such clamping devices according to the invention, the so-called "ball lock" positioning and clamping systems by the company Norelem in Markgröningen, Germany, and the company Jergens Inc. in Cleveland, Ohio, United States, have proven themselves. These positioning and clamping systems permit an exact and quick positioning and securing of structural parts. The structural parts are clamped together with a high clamping force, thereby resulting in a frictional connection between drive shaft and drum body and, on the whole, making it possible to realize high holding forces and a quick and simple replacement of the drum body. The quick replacement is aided in that only one central screw must be tightened or loosened. The screw 23 of clamping cylinder 21 and/or the pivot bolt 23 is tightened and loosened with only a few rotations. To facilitate the handling of pivot bolt 23, the clamping device 20 is provided with a receptacle 31 for accommodating a hexagonal spanner 32 or spanner wrench. The clamping cylinder 21 has a rotation-symmetrical design. Using the above-mentioned clamping systems, the clamping cylinder is provided with three smaller balls (reference numbers 25), distributed evenly along the circumference of the clamping cylinder.

The mode of operation for a clamping device of this type with balls is disclosed, for example, in U.S. Pat. No. 3,498,653, to which we expressly refer and the content of which is expressly incorporated by reference into the present patent application.

FIG. 2 shows cross-sectional details of another embodiment of a clamping device 20 on a conveying drum. The clamping device 20 is formed onto the end of the drive shaft 11, such that the drive shaft 11 and the clamping device 20 form a single structural component. To frictionally connect a cover 15 of the drum to the shaft 11, the balls 25 along the external circumference of the clamping cylinder 21 push the cover 15 from the outside against the shaft 11. A circumferentially extending sealing ring 28 is provided to hold the external balls 25 inside their recesses in the clamping cylinder 21, wherein the outer end of the clamping cylinder 21 is additionally milled for better handling.

FIG. 3 shows a cross-sectional view of a conveying drum 10 with a bushing 16, provided on the inside of the drive shaft 11, so that the balls 25 of the clamping device 20 clamp together the cover 27 and the drive shaft 11 on the inside of the bushing 16.

The installation and the use of a clamping device according to the invention for conveying devices in the tobacco-processing industry permits a quick and simple replacement of drums, wherein the existing screw connection and the drum attachment are replaced with a clamping cylinder and/or a clamping device according to the invention.

The invention has been described in detail with respect to exemplary embodiments, and it will now be apparent from the foregoing to those skilled in the art, that changes and modifications may be made without departing from the invention in its broader aspects, and the invention, therefore, as defined in the appended claims, is intended to cover all such changes and modifications that fall within the true spirit of the invention.

What is claimed is:

1. An apparatus for transporting cigarettes during a tobacco product-production, said apparatus comprising:
   a rotationally driven conveying element,
   a support about which the rotationally driven conveying element rotates and,
   a clamping device including a cover, at least one drive element and at least two holding elements wherein the rotationally driven conveying element is detachably connected by the clamping device via the cover to the support wherein a movement of the at least one drive element of the clamping device causes said at least two holding elements to change their relative position to each other, in a direction crosswise to the direction of movement of the drive element, to one of hold or release the rotationally driven conveying element and the support via the cover.

2. The apparatus of claim 1, wherein the at least two holding elements are inserted into a bushing adjacent one of the support and the rotationally driven conveying element.

3. The apparatus of claim 1 further comprising a housing, wherein said at least one drive element and the at least two holding elements are arranged inside said housing.

4. The apparatus according to claim 3, wherein the housing is approximately cylindrical.

5. The apparatus according to claim 4, wherein the housing is a clamping cylinder.

6. The apparatus according to claim 1, wherein the at least one drive element is at least one member selected from the group consisting of a bolt and a ball.

7. The apparatus according to claim 6, wherein the bolt is a screw bolt.

8. The apparatus of claim 1, wherein at least one of the at least two holding elements is a ball.

9. The apparatus of the claim 1, wherein the clamping device has a rotation-symmetrical structure.

10. The apparatus according to claim 1, wherein the clamping device is arranged concentric to the rotational axis of the rotationally driven conveying element.

11. The apparatus according to claim 1, wherein the clamping device is provided with a gripping knob.

12. The apparatus according to claim 1, wherein the at least one drive element is provided with a recess for accommodating a turning tool.

13. The apparatus according to claim 12, wherein the turning tool is a hexagonal spanner.

14. The apparatus according to claim 1, wherein the clamping device is an adapter.

15. A machine used in the tobacco-processing industry, which is a filter-tipping machine, comprising an apparatus for transporting cigarettes during a tobacco product-production, said apparatus comprising:
a rotationally driven conveying element,
a support about which the rotationally driven conveying element rotates and,
a clamping device including a cover, at least one drive element and at least two holding elements wherein the rotationally driven conveying element is detachably connected by the clamping device via the cover to the support wherein a movement of the at least one drive element of the clamping device causes said at least two holding elements to change their relative position to each other, in a direction crosswise to the direction of movement of the drive element to one of hold or release the rotationally driven conveying element and the support via the cover.

16. A method for operating an apparatus for transporting articles in the tobacco-processing industry with a rotationally driven conveying element and a support comprising:
providing a clamping device with a cover, at least one drive element and at least two holding elements, and
detachably connecting the rotationally driven conveying element to the support with said clamping device via the cover wherein a movement of the at least one drive element causes the at least two holding elements to change their position relative to each other, crosswise to the movement direction of the drive element, to one of hold or release the rotationally driven conveying element and the support via the cover.

17. The method of claim 16, wherein the holding elements can be inserted into a bushing in the support and/or the conveying element and further comprising turning the at least one drive element to cause the at least two holding elements to one of 1) push against a side of the bushing to frictionally hold the rotationally driven conveying element to the support, and 2) become loose in the bushing allowing the rotationally driven conveying element to separate from the support.

18. The method of claim 16, wherein the at least one drive element and the at least two holding elements are arranged inside a housing.

19. The method of according to claim 18, wherein the housing is a clamping cylinder.

20. The method of claim 16, wherein the at least one drive element is at least one selected from the group of a bolt and a ball.

21. The method according to claim 16, wherein the at least two holding elements are balls.

22. The method of claim 16, wherein the clamping device has a rotation-symmetrical shape.

23. The method of claim 22, wherein the clamping device is arranged concentric to a rotational axis of the rotationally driven conveying element.

24. The method of the claim 16, wherein the clamping device is provided with a gripping knob and the turning of the at least one drive element is achieved with the gripping knob.

25. The method of claim 16, wherein the at least one drive element is provided with a recess for accommodating a turning tool and the turning of the at least one drive element is achieved with the turning of the turning tool.

26. The method of claim 16, wherein the clamping device is an adapter.

* * * * *